United States Patent
Galin

(10) Patent No.: US 11,724,897 B2
(45) Date of Patent: Aug. 15, 2023

(54) SYSTEMS AND METHODS FOR SELF-LOADING A MODULAR ROBOT INTO A DELIVERY VEHICLE

(71) Applicant: Ford Global Technologies, LLC, Dearborn, MI (US)

(72) Inventor: John Galin, Mill Valley, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 17/201,720

(22) Filed: Mar. 15, 2021

(65) Prior Publication Data
US 2022/0289540 A1    Sep. 15, 2022

(51) Int. Cl.
| | | |
|---|---|---|
| B65G 67/20 | (2006.01) | |
| B66F 9/065 | (2006.01) | |
| B66F 9/075 | (2006.01) | |
| B60P 3/06 | (2006.01) | |
| B66F 9/06 | (2006.01) | |
| B60P 3/00 | (2006.01) | |
| B62D 63/02 | (2006.01) | |
| B60P 9/00 | (2006.01) | |

(52) U.S. Cl.
CPC ............. *B65G 67/20* (2013.01); *B60P 3/007* (2013.01); *B60P 3/06* (2013.01); *B66F 9/063* (2013.01); *B66F 9/065* (2013.01); *B66F 9/0755* (2013.01); *B60P 9/00* (2013.01); *B62D 63/025* (2013.01)

(58) Field of Classification Search
CPC .. B60P 3/007; B60P 3/06; B65G 67/20; B66F 9/063; B66F 9/065; B66F 9/0755

USPC ................................................. 414/522, 539
See application file for complete search history.

(56) References Cited

U.S. PATENT DOCUMENTS

| | | | | |
|---|---|---|---|---|
| 3,596,788 A | * | 8/1971 | Willie | B60R 9/042 414/718 |
| 3,768,673 A | * | 10/1973 | Nydam | B60P 1/433 414/522 |
| 3,811,579 A | * | 5/1974 | Black | B65G 67/20 414/500 |

(Continued)

FOREIGN PATENT DOCUMENTS

| | | |
|---|---|---|
| WO | 2018024852 A1 | 2/2018 |
| WO | 2018210016 A1 | 11/2018 |

OTHER PUBLICATIONS

Bastian Solutions, "Advanced Automation Reaches Shipping Docks", ULTRA: Robotic Truck Loading & Unloading, Toyota Advanced Logistics Company, Bastian Solutions ULTRA Pilot Program, 2020, 7 pages.

*Primary Examiner* — James Keenan
(74) *Attorney, Agent, or Firm* — Brandon Hicks; Eversheds Sutherland (US) LLP

(57) ABSTRACT

A modular robot system which may be configured to accommodate packages of varying sizes is provided. The modular robot may include a base having omni-directional wheels and cameras and sensors, one or more modular containers, and a lid, which may be releasably linked together to form a small, medium or larger units. The base may include a lifting mechanism to vertically raise the robot to a desired height in alignment with a delivery vehicle. Moreover, retractable loading arms of the vehicle may be extended from the vehicle to engage with the robot to facilitate self-loading of the robot into the delivery vehicle.

15 Claims, 18 Drawing Sheets

(56) References Cited

U.S. PATENT DOCUMENTS

| | | | | |
|---|---|---|---|---|
| 3,865,262 | A * | 2/1975 | Smith, Jr. | B60P 1/6418 |
| | | | | 414/800 |
| 5,538,386 | A * | 7/1996 | Scheibel | B62B 5/0003 |
| | | | | 414/458 |
| 6,409,186 | B2 * | 6/2002 | Bennington | B60P 3/0257 |
| | | | | 414/495 |
| 9,056,676 | B1 | 6/2015 | Wang | |
| 9,598,272 | B2 * | 3/2017 | Ivanchenko | B66F 9/06 |
| 10,345,818 | B2 * | 7/2019 | Sibley | B66F 9/0755 |
| 10,512,571 | B2 * | 12/2019 | Carletti | B60P 1/4471 |
| 2012/0237326 | A1 * | 9/2012 | Van Ness | A61G 3/0236 |
| | | | | 414/812 |
| 2016/0221768 | A1 | 8/2016 | Kadaba et al. | |
| 2018/0155029 | A1 | 6/2018 | Gil | |
| 2019/0329691 | A1 * | 10/2019 | Crawford | G05D 1/0291 |
| 2020/0174494 | A1 * | 6/2020 | Lessels | G06Q 50/28 |
| 2020/0230822 | A1 * | 7/2020 | Sohmshetty | B25J 5/007 |
| 2021/0155146 | A1 * | 5/2021 | Yabushita | B65G 67/20 |
| 2021/0209543 | A1 * | 7/2021 | Scott | B60R 11/04 |
| 2022/0197289 | A1 * | 6/2022 | Galin | B60L 50/66 |

\* cited by examiner

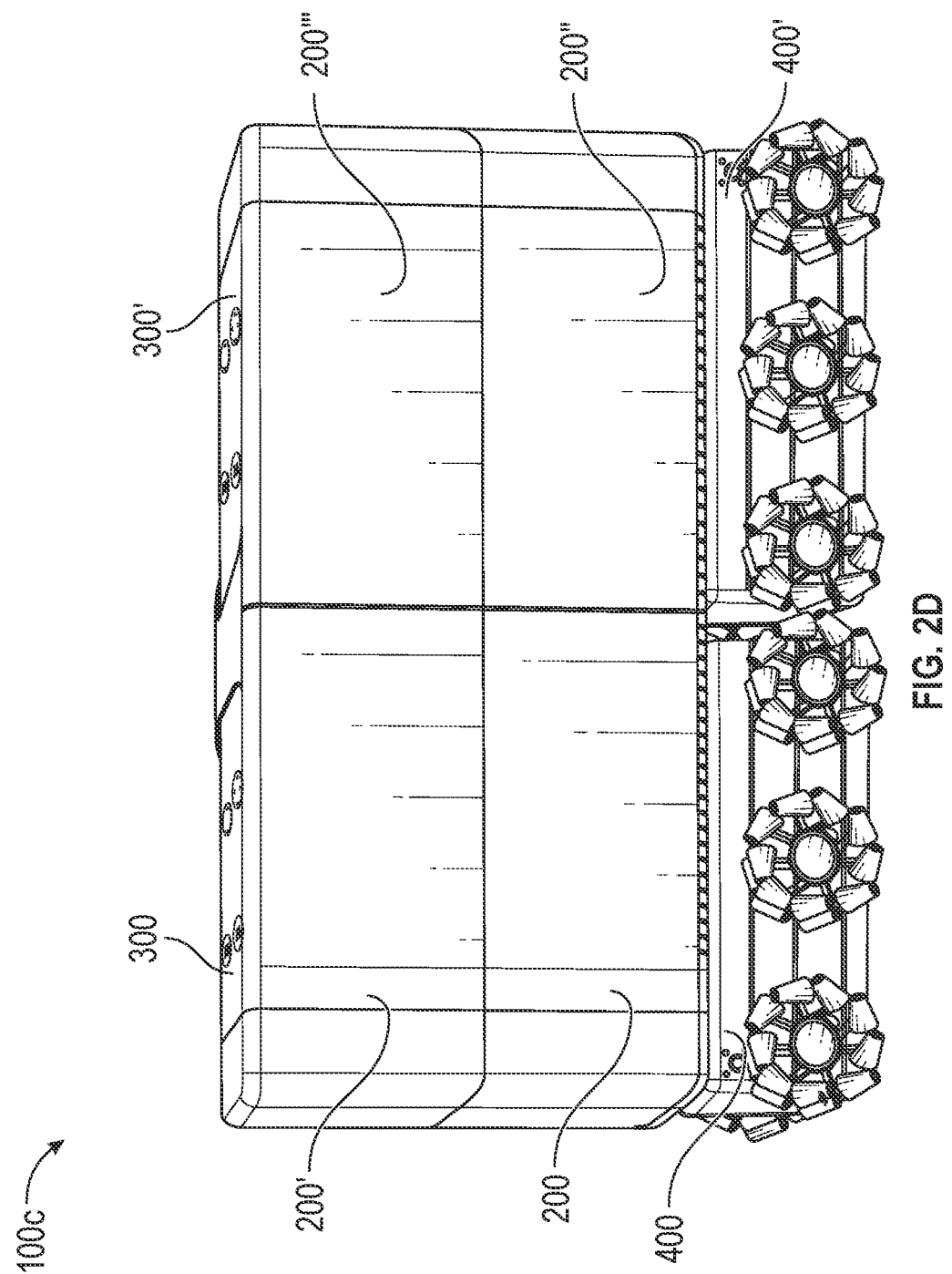

SYSTEMS AND METHODS FOR SELF-LOADING A MODULAR ROBOT INTO A DELIVERY VEHICLE

BACKGROUND

Worldwide e-commerce spending is increasing, resulting in an increase in package delivery operations. In order to improve hourly throughputs to meet the increase in demand, it is important to examine every aspect of delivery operation and cut any time wasted in the delivery process. It is with respect to these and other considerations that the disclosure made herein is presented.

BRIEF DESCRIPTION OF THE DRAWINGS

FIGS. 2B to 2D illustrate various configurations of the interlocking reconfigurable modular robot in accordance with the principles of the present disclosure.

DETAILED DESCRIPTION

Overview

Figure 1:
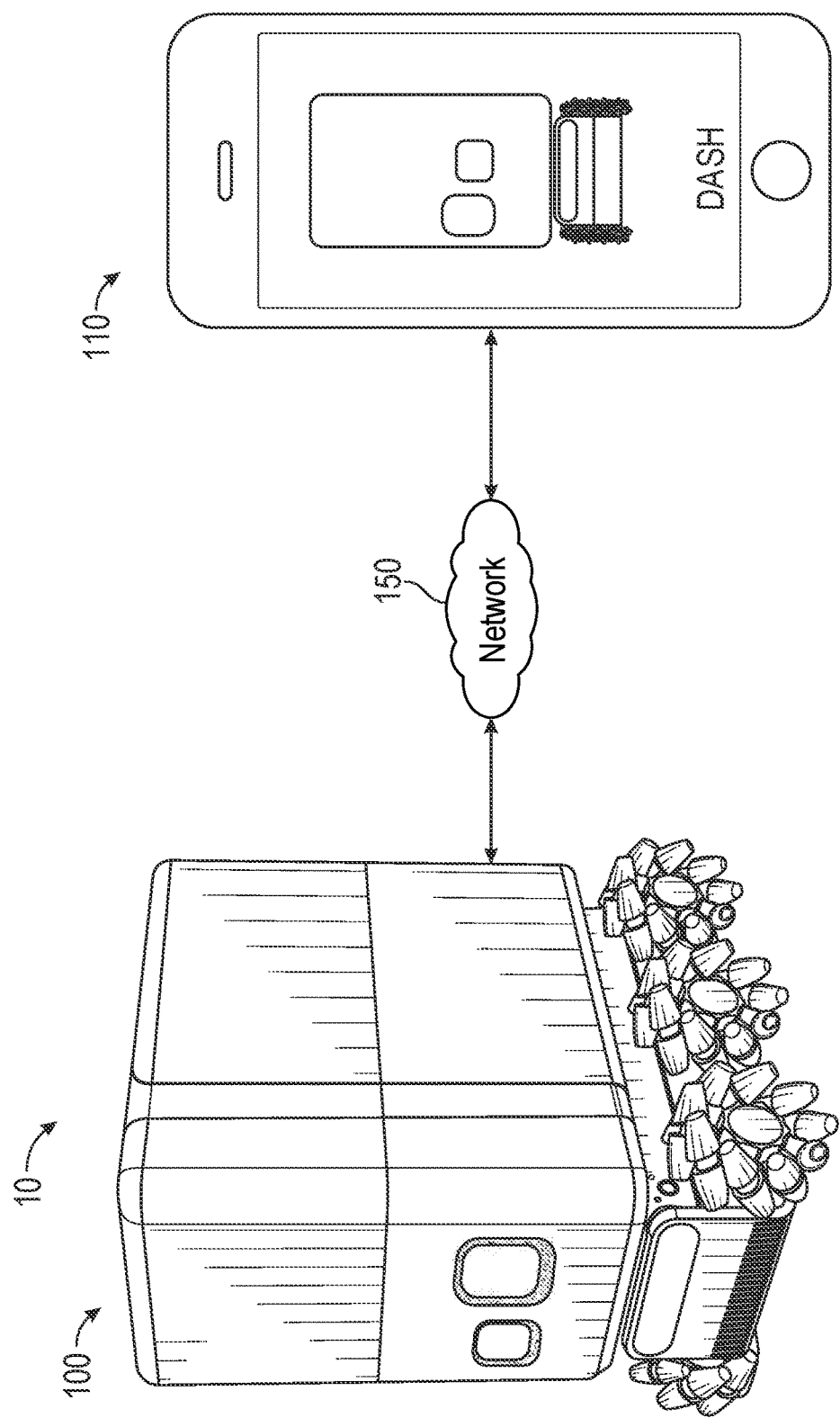
FIG. 1 illustrates a system for delivering items using an interlocking reconfigurable modular locker in accordance with the principles of the present disclosure.

A modular robot system which may be configured to accommodate packages of varying sizes is provided. The robot may include omni-directional wheels, a lower layer having sensors/cameras and power/data link, and a upper layer having a control top. In-between the two layers are modular units which may be linked together to form a small, medium or larger units. The power/data link provides a connection/communication link which may be utilized to provide information to be used in a number of ways. For example, the connection/communication link may allow two or more modules to communicate with each other, enable external displays of multiple modules to act as one large unit, control the motion of the drawers, e.g., allowing them to open/close, and allow the processor(s) in the control top to communicate with the drive system of the omni-directional wheels. A set of alternating interlocking raised and lowered sections on corresponding surfaces enable the various layers of the module to interlock with one another. Interlocking of multiple modules may be established by sliding one surface over the other. These sections may be used to create robot containers of varying sizes and may allow multiple robots to interlock together to carry even larger packages.

Moreover, the robot that is capable of loading itself into a delivery vehicle without using a ramp. To do so, the robot moves to the rear of the delivery vehicle and positions itself such that one or more loading arms from the vehicle is able to assist the robot in loading itself into the vehicle. This positioning may be achieved using the various sensors on both the vehicle and the robot, and based on communication between the two. Additional aids such as fiducials on the rear of the vehicle may be used to help the robot to align itself and position itself close enough to the vehicle for the loading arms of the vehicle to be able to adequately operate. Next, the doors at the rear of the vehicle may open, and a scissor lift of the robot may be operated to lift the robot to the required height relative to the loading arm of the vehicle, thereby enabling the loading arm to aid the robot. The robot may use its cameras and appropriately placed fiducials on sections of the loading arm that are in view, or other fiducials located within the vehicle, to help it to determine how high the scissor lift needs to go. Similarly, the vehicle may include cameras that are able to provide images and communicate with the robot. When the robot is aligned with the vehicle, the scissor lift is locked, and the robot is stationary. This arrangement provides a robust solution and minimizes changes of any weight shift that could cause the robot to fall, or the packages to be dropped.

A loading arm is then extended from the vehicle. The loading arm may include two upside-down "L" shaped extrusions. For example, the short sections of the "L" may provide support for the underside of the modular unit of the robot. The loading arms are anchored at one end within the vehicle. The other end of the loading arms is able to extend to support the full depth of the robot, on either side of the scissor lift mechanism. The short section of the L-shaped extrusions is shaped to cover the maximum horizontal area between scissor-lift platform (on which the robot is seated) and the underside of the robot itself, to thereby secure the robot. Once sensors on the robot and/or vehicle determine that the loading arms have fully or at least sufficiently extended to fully support the robot, the scissor lift is instructed to retract the omni-directional wheels of robot until it is within the recess formed by the two "L-shaped" extrusions. Finally, when the scissor lift has been lifted a sufficient distance such that the wheels of the robot will not collide with the structure of the vehicle, e.g., the vehicle's bumper, when the robot is retracted into the van, the loading arm is retracted back into the vehicle. The distance the scissor lift is lifted may be mechanically determined, may be determined by use of sensors, e.g., cameras, and/or may be determined by other known means. In the event that there is more than one robot to be transported by the vehicle, when all wheels are determined to be on the floor of the vehicle, the robot may be triggered to move forward over the lifting arm and into the front portion of the vehicle. In this manner, a vehicle may transport up to, e.g., 4 robots, which may be used to deliver goods to customers.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, system 10 for delivering items packages of varying sizes is provided. System 10 includes modular robot 100 and further may include mobile application 110 installed on, e.g., smartphone or tablet. Modular robot 100 and mobile application 110 may be communicatively coupled via, e.g., network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication. Mobile application 110 may be used by a user to communicate commands to modular robot 100 and/or receive information indicative of, e.g., status of modular robot 100 or delivery status, as described in further detail below.

Figure 2A:
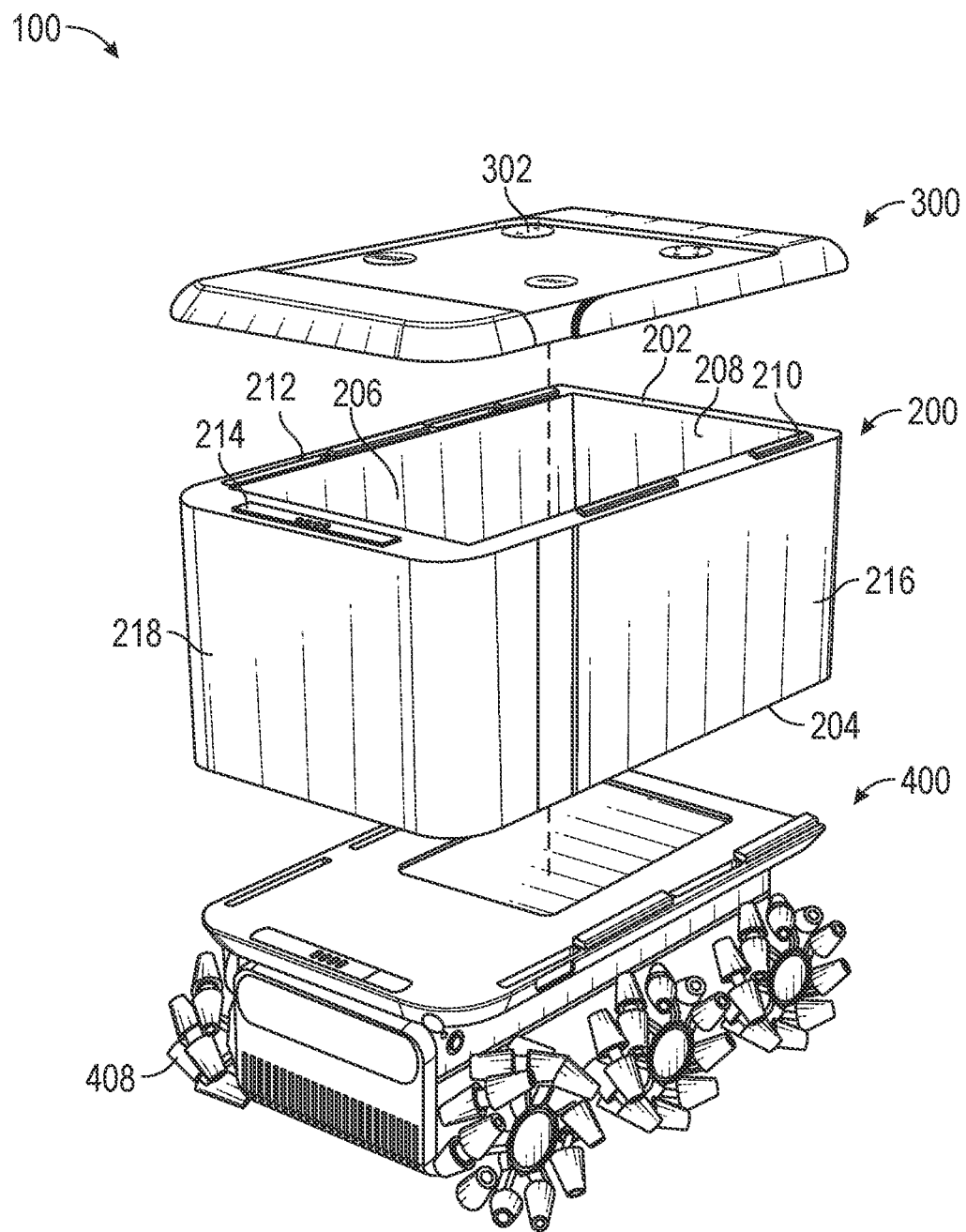
FIG. 2A illustrates the components of an interlocking reconfigurable modular robot in accordance with the principles of the present disclosure.

Referring now to FIG. 2A to 2D, an exemplary interlocking reconfigurable modular robot is provided. As shown in FIG. 2A, modular robot 100 may include one or more modular containers, e.g., modular container 200, lid 300, and base 400. Multiple modular containers may be stacked and/or otherwise coupled together to increase or decrease the available compartment size depending on the size of the package to be delivered. Specifically, each of the one or more modular containers, lid 300, and base 400, may include a set of rails and tracks, which may releasably engage with each other to provide the various modular robot configurations described herein.

As shown in FIG. 2A, modular container 200 may be a storage container having compartment 206 sized and shaped to receive a package to be delivered. Modular container 200 includes top side 202 and bottom side 204. For illustrative purposes, FIG. 2A illustrates top side 202 as above bottom side 204, e.g., relative to the ground, however, as described in further detail below, modular container 200 may be flipped such that bottom side 204 may be above top side 202 relative to the ground. Moreover, top side 202 may have an opening for access to compartment 206; whereas, bottom side 204 may include a bottom surface that encloses compartment 206. Accordingly, a package within compartment 206 may sit on the bottom surface of modular container 200.

A first lateral wall of modular container 200 may include a set of rails 210 extending along the top edge of the first lateral wall, e.g., at top side 202. In addition, a second lateral wall of modular container 200 opposite to the first lateral wall may include a set of tracks 212 extending along the top edge of the second lateral wall, e.g., at top side 202. Tracks 212 may have a track geometry sized and shaped to slidably receive rails 210, such as a dovetail configuration or the like. Accordingly, rails 210 have a rail geometry sized and shaped to be slidably received by the tracks 212. Moreover, the first lateral wall of modular container 200 may include a set of tracks extending along the bottom edge of the first lateral wall, e.g., at bottom side 204, which may be identical to tracks 212, and the second lateral wall of modular container 200 may include a set of rails extending along the bottom edge of the second lateral wall, e.g., at bottom side 204, which may be identical to rails 210.

As shown in FIG. 2A, rails 210 on the top edge of the first lateral wall may include two rail segments. Moreover, the tracks on the bottom edge of the first lateral wall also may include two track segments. Each of the track segments on the bottom edge of the first lateral wall are aligned with each of the rail segments on the top edge of the first lateral wall. Similarly, tracks 212 on the top edge of the second lateral wall may include two track segments, and the rails on the bottom edge of the second lateral wall also may include two rail segments. Each of the rail segments on the bottom edge of the second lateral wall are aligned with each of the track segments on the top edge of the second lateral wall. Moreover, the rail segments of rails 210 may be offset from the track segments of tracks 212 so that when modular container 200 is flipped 180 degrees, tracks 212 of the second lateral wall will be in the same position as where the tracks of the first lateral wall were prior to the flip, and accordingly, rails 201 of the first lateral wall will be in the same position as where the rails of the second lateral wall were prior to the flip. As will be understood by a person having ordinary skill in the art, the sets of rails and tracks of modular container 200 may include less or more than two rail segments and track segments, respectively.

Further, modular container 200 may include slidable rear door 208. Door 208 may transition between an open configuration where door 208 is positioned adjacent to the bottom surface of modular container 200 and a closed configuration, as shown in FIG. 2A, where door 208 is perpendicular to the bottom surface of modular container 200 and extends along the rear edges of the first and second lateral walls. Accordingly, the modular container 200 may include a door track extending along and adjacent to bottom side 204 and the rear edges of the first and second lateral walls, such that door 208 may slide along the door track between the open and closed configurations.

Additionally, as shown in FIG. 2A, modular container 200 may include one or more display screens 216, e.g., on the exterior surface of the first and/or second lateral wall, and display screen 218 on the exterior surface of a front wall of modular container 200. As described in further detail below, screens 216 and 218 may display information indicative of status of modular robot 100 or delivery status. Accordingly, modular container 200 may include electric throughout 214 for electrically linking modular container 200 with lid 300 and base 400, and thereby power the electrical components of modular container 200, e.g., display screens 216 and 218, compartment 206, door 208, conveyor belt 220, etc.

Lid 300 may have a lower surface and an upper surface. Lid 300 also may include a set of rails having the rail geometry and tracks having the track geometry, e.g., disposed along the lower surface of lid 300. Specifically, the set of tracks of lid 300 may be aligned with rails 210 of the first lateral wall of modular container 200 and the set of rails of lid 300 may be aligned with tracks 212 of the second lateral wall of modular container 200, such that lid 300 may releasably engage with top side 202 of modular container 200. Accordingly, when modular container 200 is flipped 180 degrees, the set of tracks of lid 300 may be aligned with the set of rails of the second lateral wall of modular container 200 and the set of rails of lid 300 may be aligned with the set of tracks of the first lateral wall of modular container 200, such that lid 300 may releasably engage with bottom side 204 of modular container 200. In addition, lid 300 may include a user interface on its upper surface for directly receiving commands from a user, as described in further detail with regard to FIG. 3. Accordingly, lid 300 further may include an electrical and data link for electrically linking lid 300 to modular container 200 and base 400, to thereby power the user interface.

Base 400 may have a lower surface and an upper surface. The lower surface of base 400 may be removably coupled to, e.g., a base component having a plurality of omni-directional wheels 408. Base 400 also may include a set of rails having the rail geometry and tracks having the track geometry, e.g., disposed along the upper surface of base 400. Specifically, the set of rails of base 400 may be aligned with the set of tracks of the first lateral wall of modular container 200 and the set of tracks of base 400 may be aligned with the set of rails of the second lateral wall of modular container 200, such that base 400 may releasably engage with bottom side 204 of modular container 200. Accordingly, when modular container 200 is flipped 180 degrees, the set of rails of base 400 may be aligned with tracks 212 of the second lateral wall of modular container 200 and the set of tracks of base 400 may be aligned with rails 210 of the first lateral wall of modular container 200, such that base 400 may releasably engage with top side 202 of modular container 200. Moreover, in the same manner, lid 300 may releasably engage with base 400, e.g., with no modular containers therebetween, by aligning the sets of rails and tracks of lid 300 with the sets of tracks and rails of base 400. In addition, base 400 may include a plurality of sensors and/or cameras for self-driving of modular robot 100. Additionally or alternatively, modular container 200 also may include a plurality of sensors and/or cameras for self-driving of modular robot 100.

Additionally or alternatively, the upper surface of base 400 may be coupled to other unique modular units in the same releasable manner as described above. For example, the unique modular unit may be configured to deliver items at a specific temperature, e.g., frozen food, and therefore may be insulated and/or include a refrigeration mechanism. In addition, the unique modular unit may include a compartment for storing tools, e.g., construction tools, as well as an electric battery component for providing a mobile energy source, e.g., to a construction site. Moreover, the unique modular unit may be configured to function as a hotspot to provide mobile connectivity, e.g., for law enforcement purposes. Accordingly, base 400 may be releasably engaged to various unique modular units for various mobile purposes.

Figure 2B:
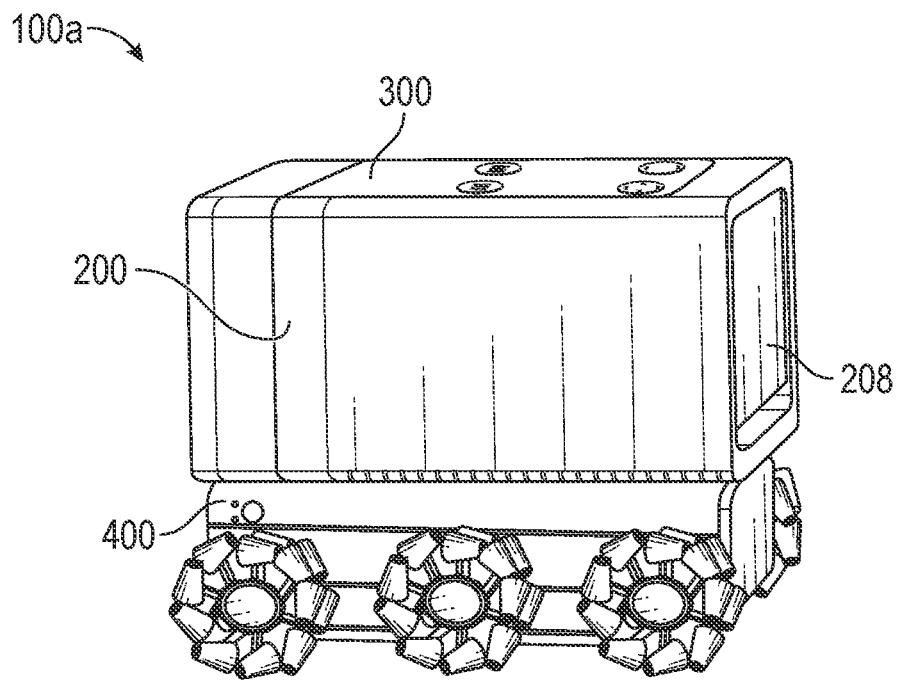
Figure 2C:
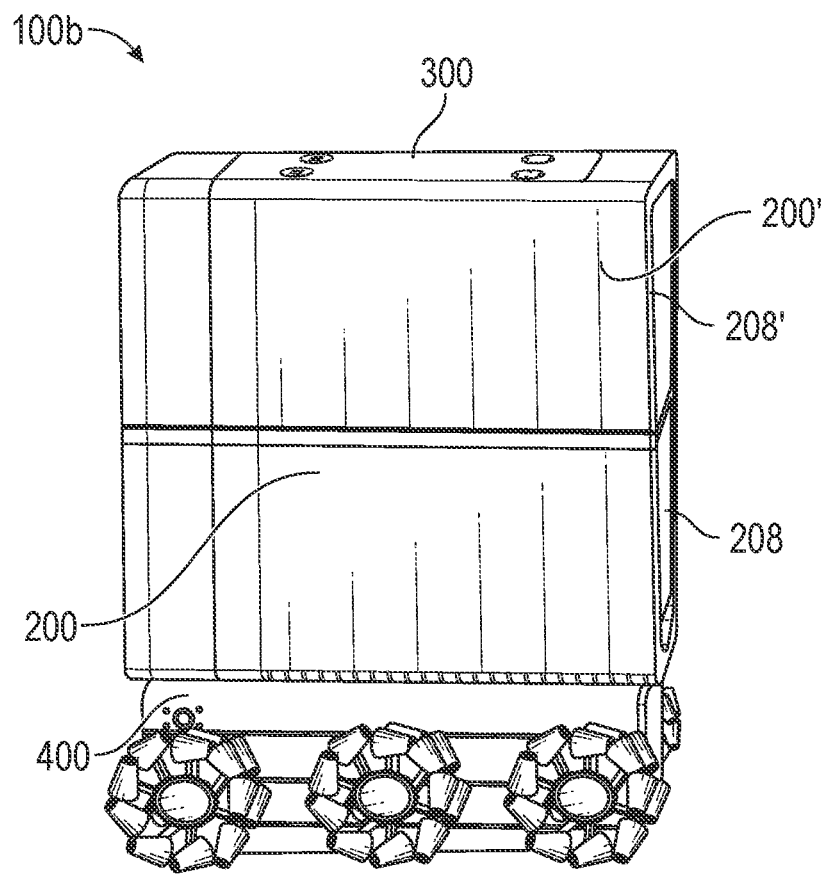

FIG. 2B illustrates one of the configurations of modular robot 100, e.g., modular robot 100a, which includes base 400, modular container 200, and lid 300. Accordingly, modular robot 100a may receive a package up to a first size, e.g., a small package via door 208. FIG. 2C illustrates another configuration of modular robot 100, e.g., modular robot 100b, which includes base 400, two modular containers, e.g., modular container 200 and modular container 200', and lid 300. As shown in FIG. 2C, modular containers 200, 200' are stacked such that the top sides of both modular containers 200, 200' are above the bottom sides of modular containers 200, 200', respectively. Accordingly, the compartment of modular robot 100b will include two separate compartments, e.g., separated by the bottom surface of modular container 200'. Doors 208, 208' may provide access into the separate compartments of modular containers 200, 200', respectively.

FIG. 2D illustrates yet another configuration of modular robot 100, e.g., modular robot 100c, which includes base 400, base 400', modular container 200, modular container 200', modular container 200'', modular container 200''', lid 300, and lid 300'. Base 400, modular containers 200, 200', and lid 300 may form a first modular robot similar to modular robot 100b, and base 400', modular containers 200'', 200''', and lid 300' may form a second modular robot similar to modular robot 100b. The first and second modular robots may be releasably coupled, e.g., via their respective rear edges, to form modular robot 100c, as described in further detail below.

Figure 3:
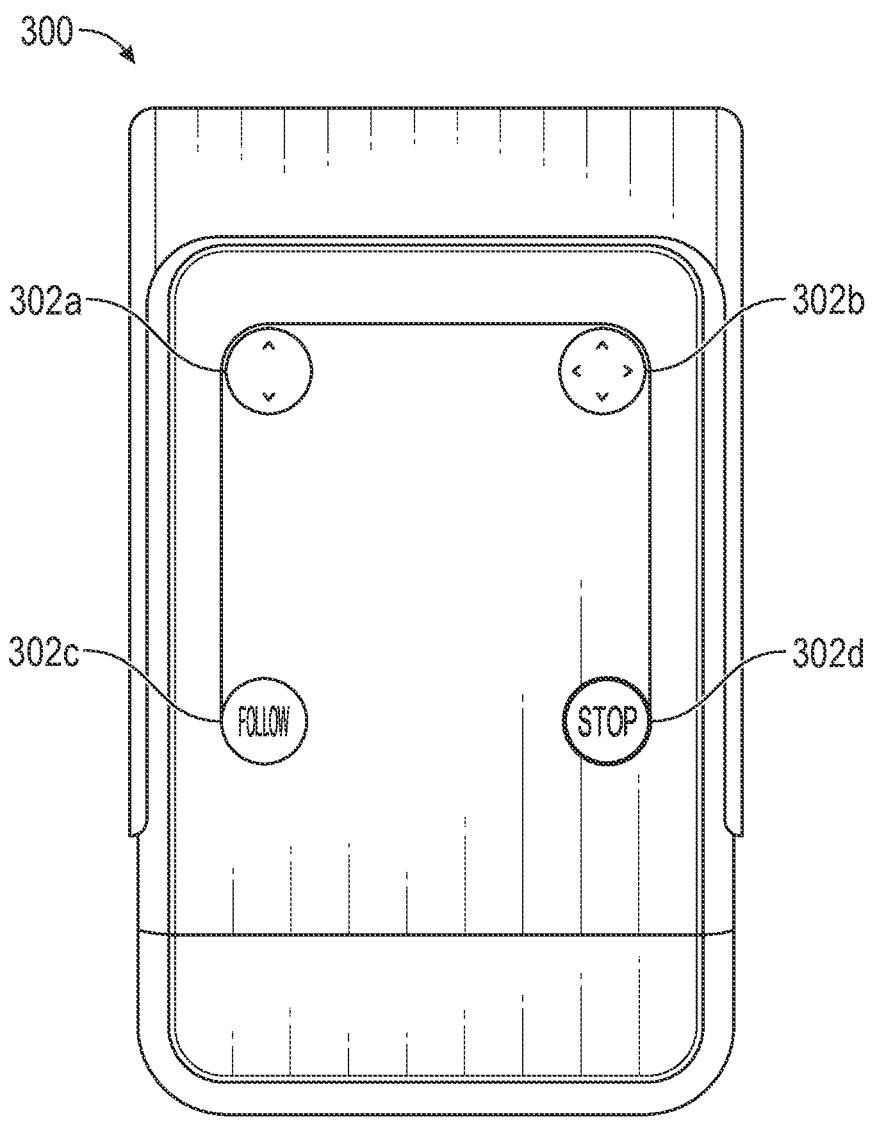
FIG. 3 illustrates an exemplary lid of the interlocking reconfigurable modular robot in accordance with the principles of the present disclosure.

Referring now to FIG. 3, an exemplary lid is provided. As described above, lid 300 may include a user interface on its upper surface. As shown in FIG. 3, the user interface may include actuators 302a for controlling height adjustment of the modular robot, 302b for controlling fine movement of the modular robot, 302c for initiating the follow command of the modular robot, e.g., to begin a delivery process such as by locating the package to be delivered within a warehouse, and 302d for initiating the stop command of the modular robot. Accordingly, when a delivery has been initiated, modular robot 100, using sensors and cameras, may self-navigate to the package to be delivered, and then onto a delivery vehicle.

Figure 4A:
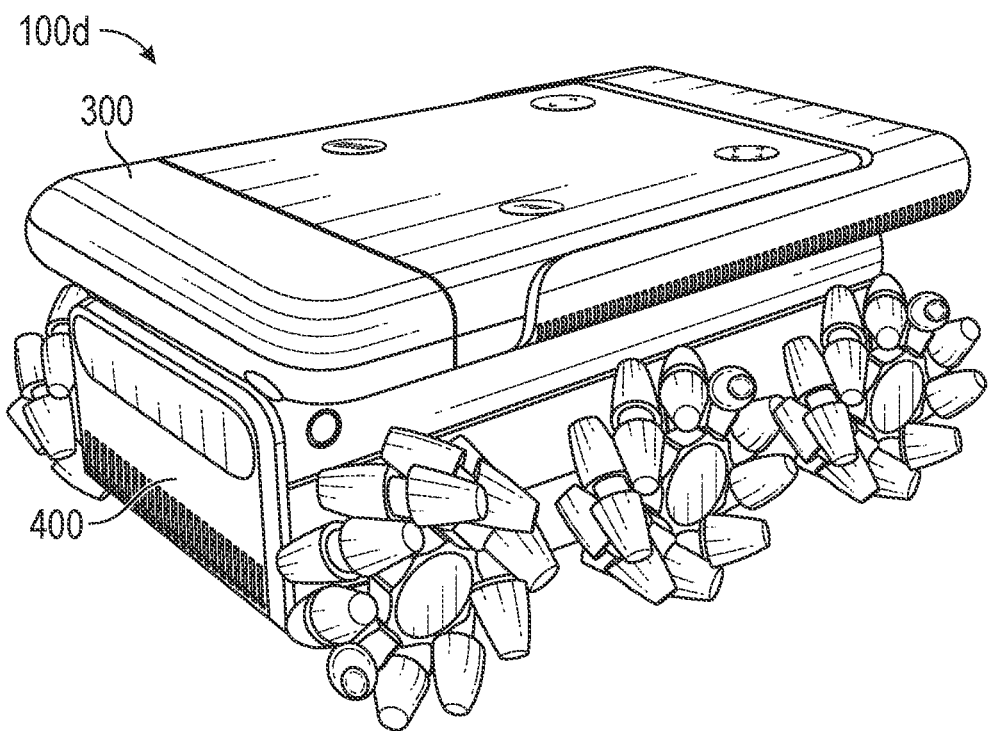
FIGS. 4A to 4M illustrates various configurations of the interlocking reconfigurable modular robot in accordance with the principles of the present disclosure.
Figure 4B:
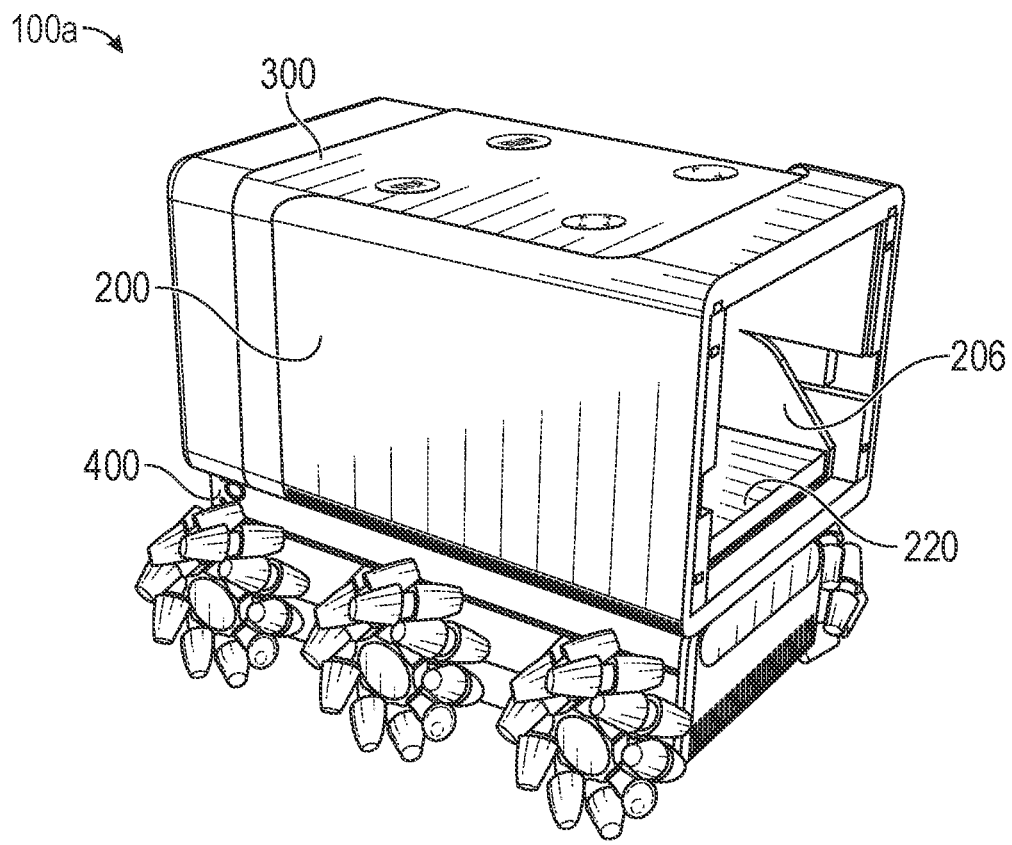
Figure 4C:
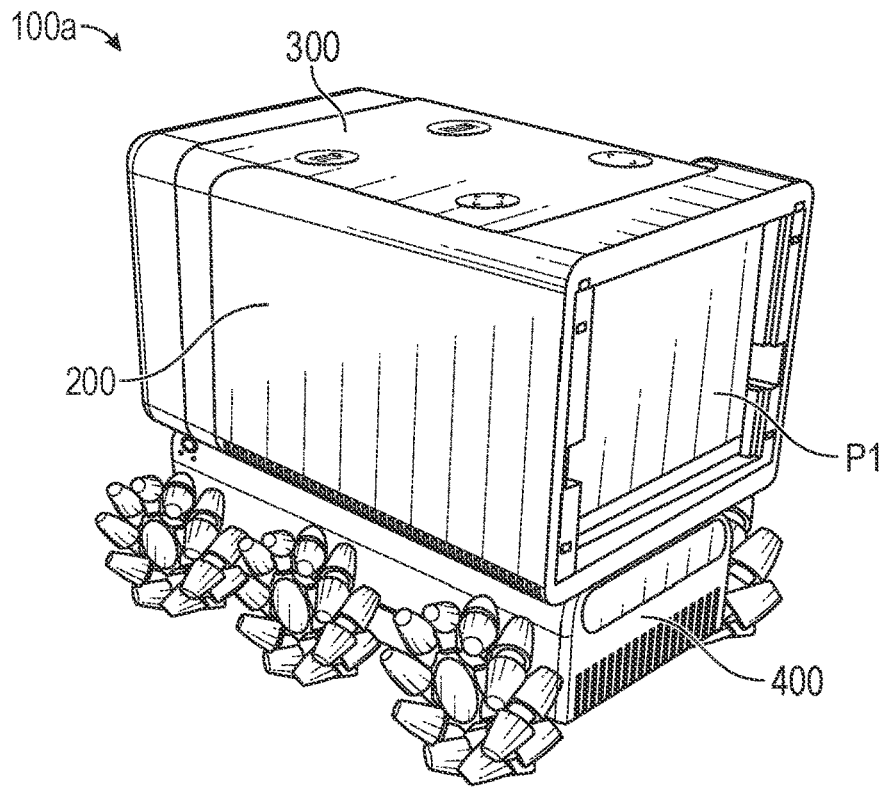

Referring now to FIGS. 4A to 4M, the transition between the various configurations of the interlocking reconfigurable modular robot is provided. FIG. 4A, illustrates a configuration of modular robot 100, e.g., modular robot 100d, which includes base 400 and lid 300, without any modular containers therebetween. Lid 300 may be disengaged from base 400, and modular container 200 may be releasably engaged with base 400 and lid 300, e.g., manually, to form modular robot 100, as shown in FIG. 4B. Accordingly, compartment 206 of modular robot 100a may receive a package up to a first size, e.g., package P1, as shown in FIG. 4C. As shown in FIG. 4B, an interior surface of the bottom surface of modular container 200 may include conveyor belt 220. Conveyor belt 220 may be actuated to facilitate loading and/or unloading of a package into compartment 206.

Figure 4D:
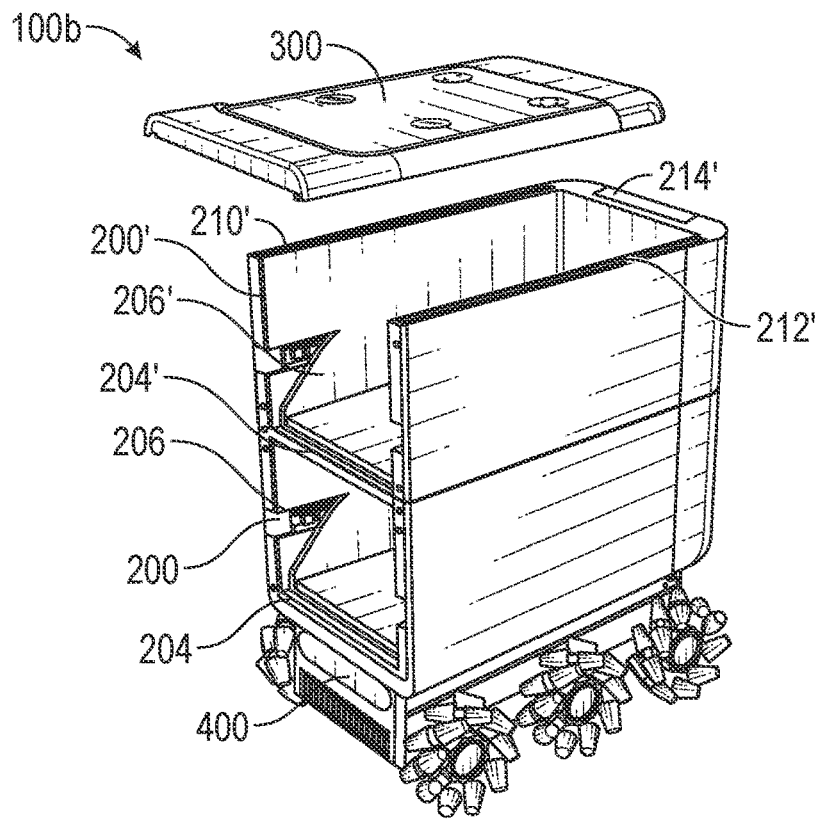
Figure 4E:
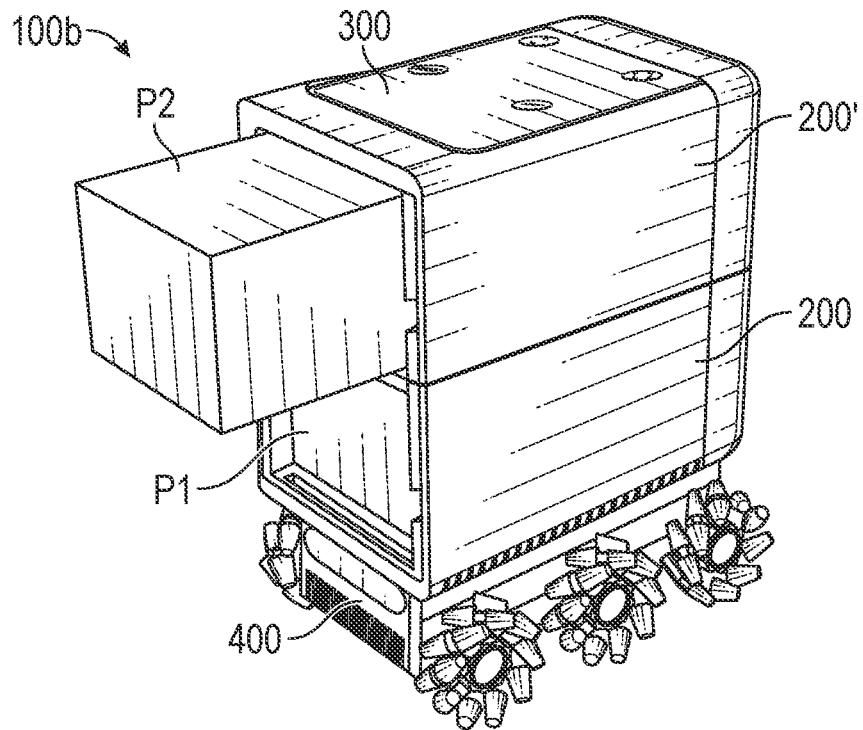

As shown in FIG. 4D, lid 300 may be disengaged from top side 202 of modular container 200, and the bottom side of a second modular container, e.g., bottom side 204' of modular container 200', may releasably engage with top side 202 of modular container 200. Lid 300 may then be releasably engaged with top side 202' of modular container 200', thereby forming modular robot 100b having compartment 206 and compartment 206'. Accordingly, as shown in FIG.

4E, compartment 206 may receive a first package, e.g., P1, and compartment 206 may receive a second package, e.g., P2, up to the same maximum size of P1.

Figure 4F:
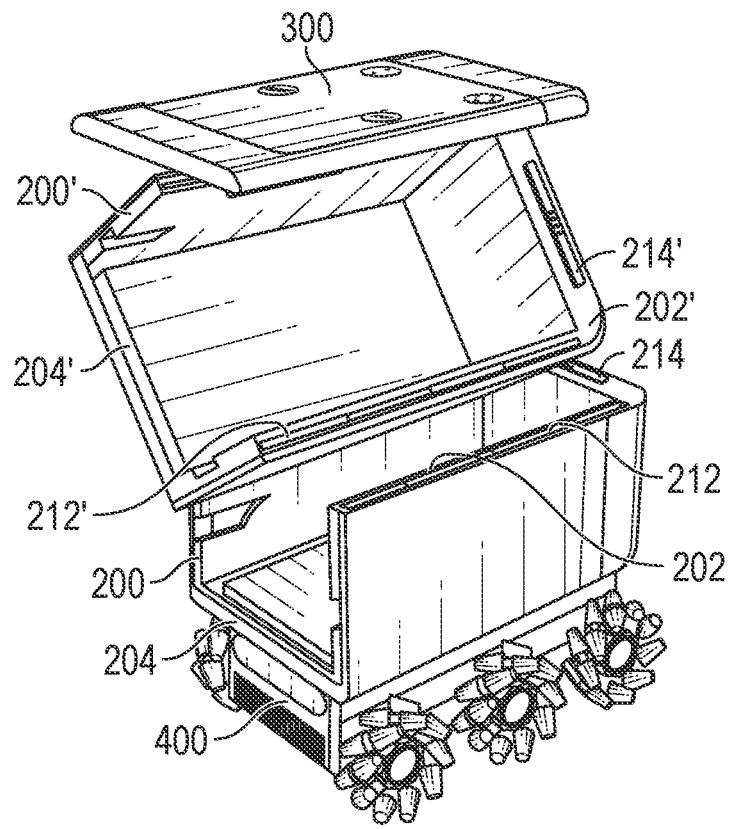
Figure 4G:
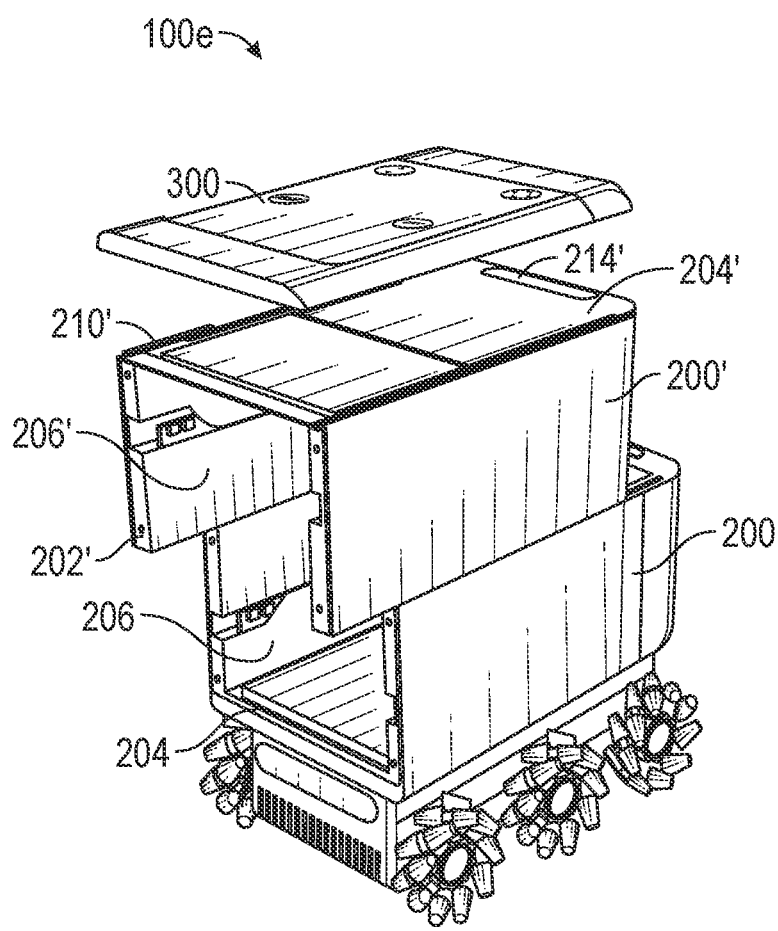
Figure 4H:
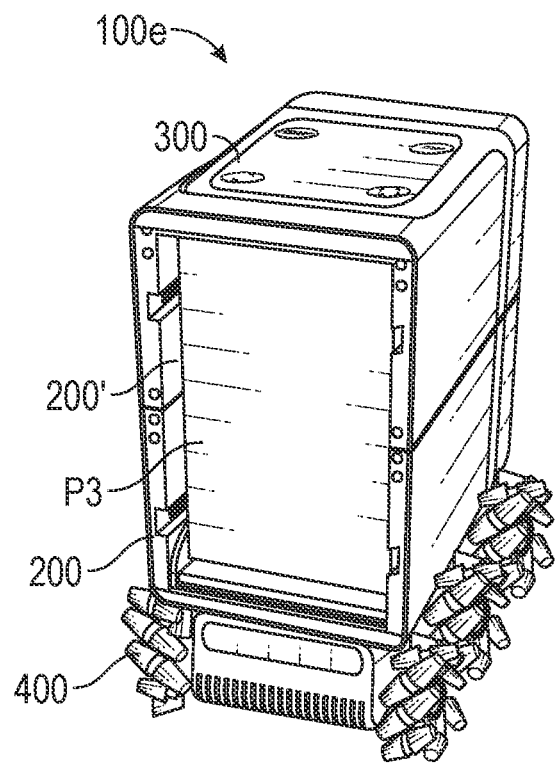

As shown in FIG. 4F, lid 300 may be disengaged from top side 202' of modular container 200', and modular container 200' may be disengaged from modular container 200, such that modular container 200' may be flipped 180 degrees and releasably engaged with modular container 200. For example, top side 202' of modular container 200' may be releasably engaged with top side 202 of modular container 200 to form modular robot 100e, as shown in FIG. 4G. Lid 300 may then be releasably engaged with bottom side 204' of modular container 200'. As shown in FIG. 4G, the compartment of modular robot 100e may be formed by compartment 206 and compartment 206' without any surface therebetween. Accordingly, the compartment of modular robot 100e may be sized and shaped to receive a third package, e.g., P3 having a size up to the maximum size of the sum of compartments 206 and 206', as shown in FIG. 4H.

Figure 4I:
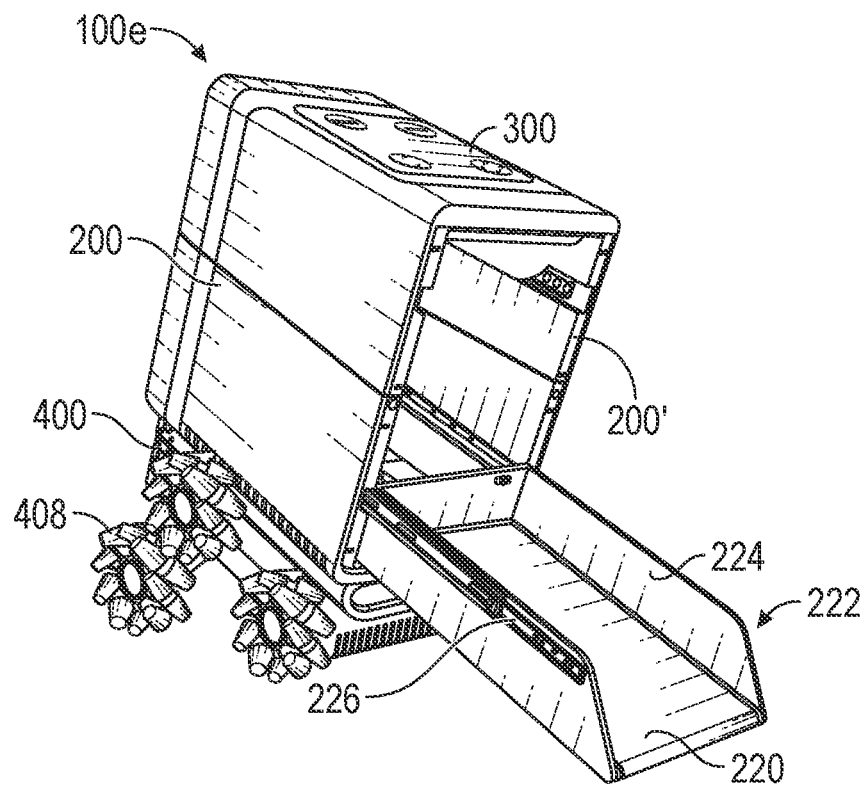

As shown in FIG. 4I, wheels 408 of base 400 may be actuated to change the angle of base 400 relative to the ground. Accordingly, slidable ramp 222 may be actuated to controllably slide out of modular container 200, thereby forming a ramp with the ground. Slidable ramp may include side walls 224 and sliding rails 226 disposed on an exterior surface of side walls 224 for sliding along a corresponding track extending along an interior surface of the first and second lateral walls of modular container 200. In addition, conveyor belt 220 may be actuated to facilitate loading and/or unloading of a package to be delivered when ramp 222 is deployed.

Figure 4J:
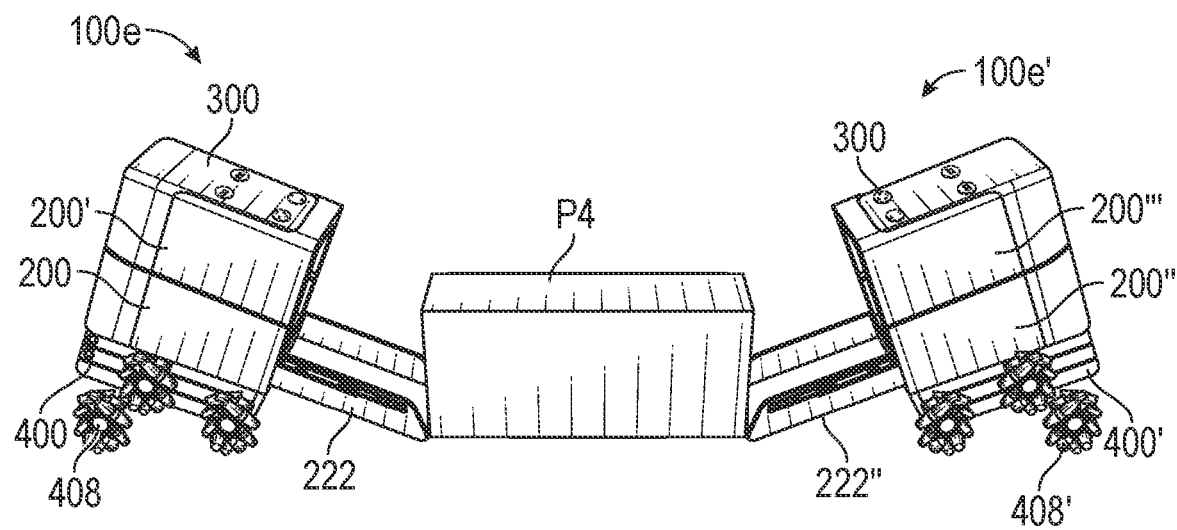
Figure 4K:
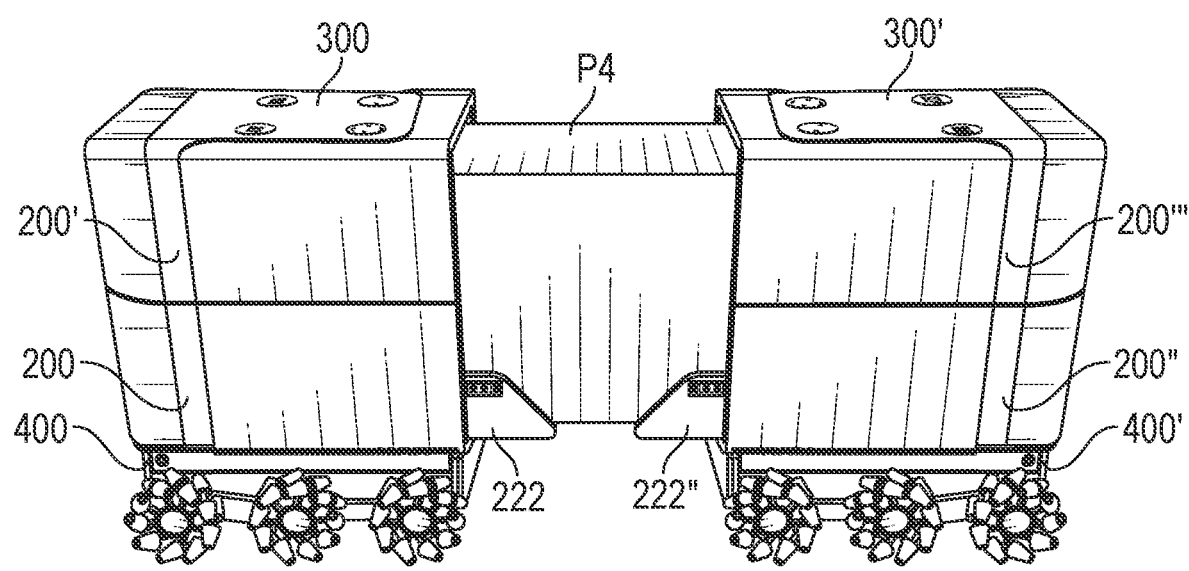
Figure 4L:
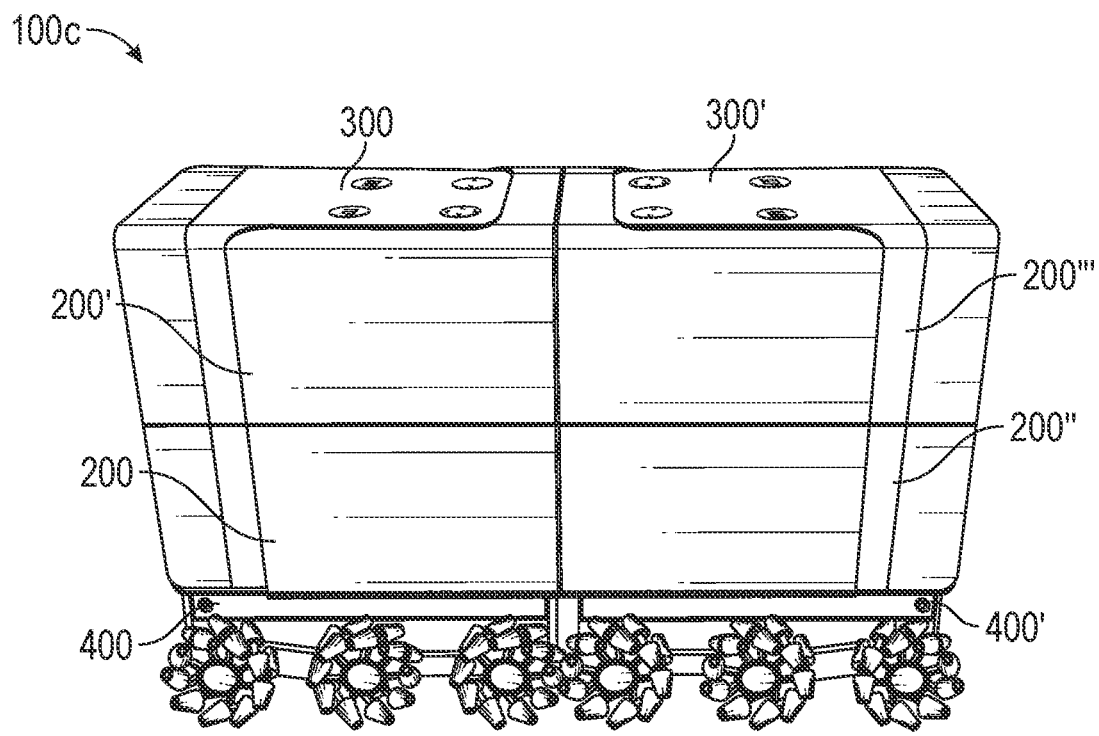
Figure 4M:
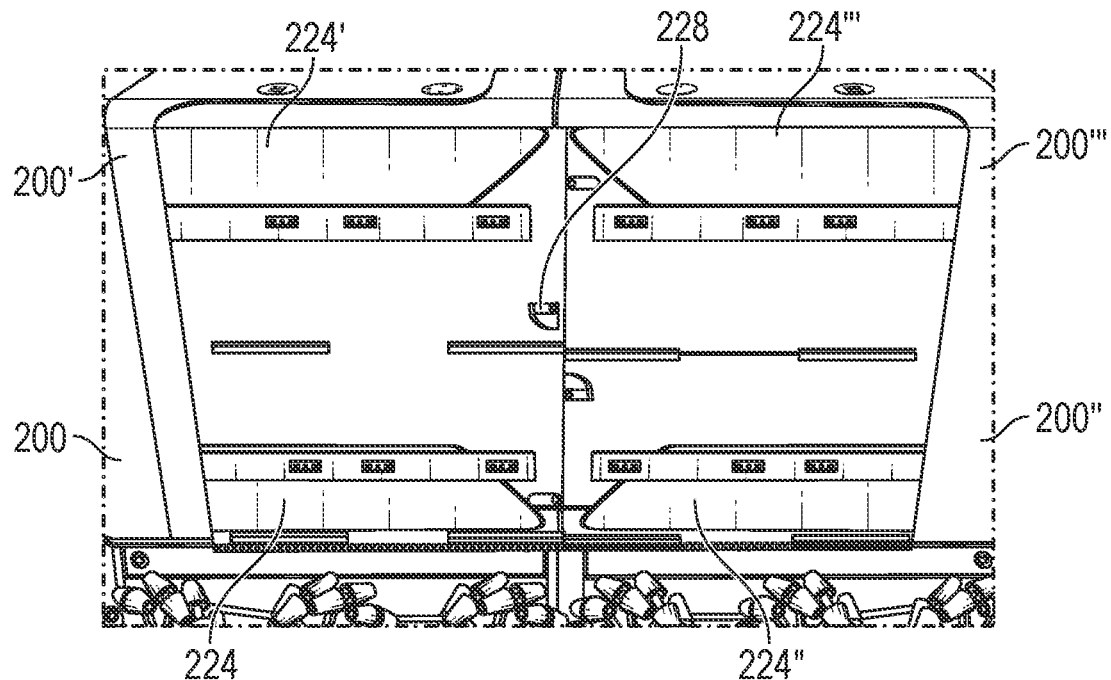

As shown in FIG. 4J, two modular robots, e.g., modular robot 100e and modular robot 100e' having the same configuration as modular robot 100e, may work together to receive a fourth package, e.g., P4 having a size up to the maximum size of the sum of the compartments of modular robot 100e and modular robot 100e'. For example, wheels 408 and 408' may be actuated to cause modular robots 100e and 100e' to be angled relative to the ground, so that ramps 222 and 222' may be deployed at an angle to the ground, adjacent to P4. Next, modular robots 100e and 100e' may move toward each other while wheels 408 and 408' return to a leveled configuration such that P4 rests parallel to the ground on both ramps 222 and 222', as shown in FIG. 4K. Modular robots 100e and 100e' will continue to move toward each other until the rear edges of modular robots 100e and 100e' meet to thereby form modular robot 100c, as shown in FIG. 4L. As shown in FIG. 4M, locking system 228 may be engaged to releasably couple modular robots 100e and 100e' of modular robot 100c.

Figure 5:
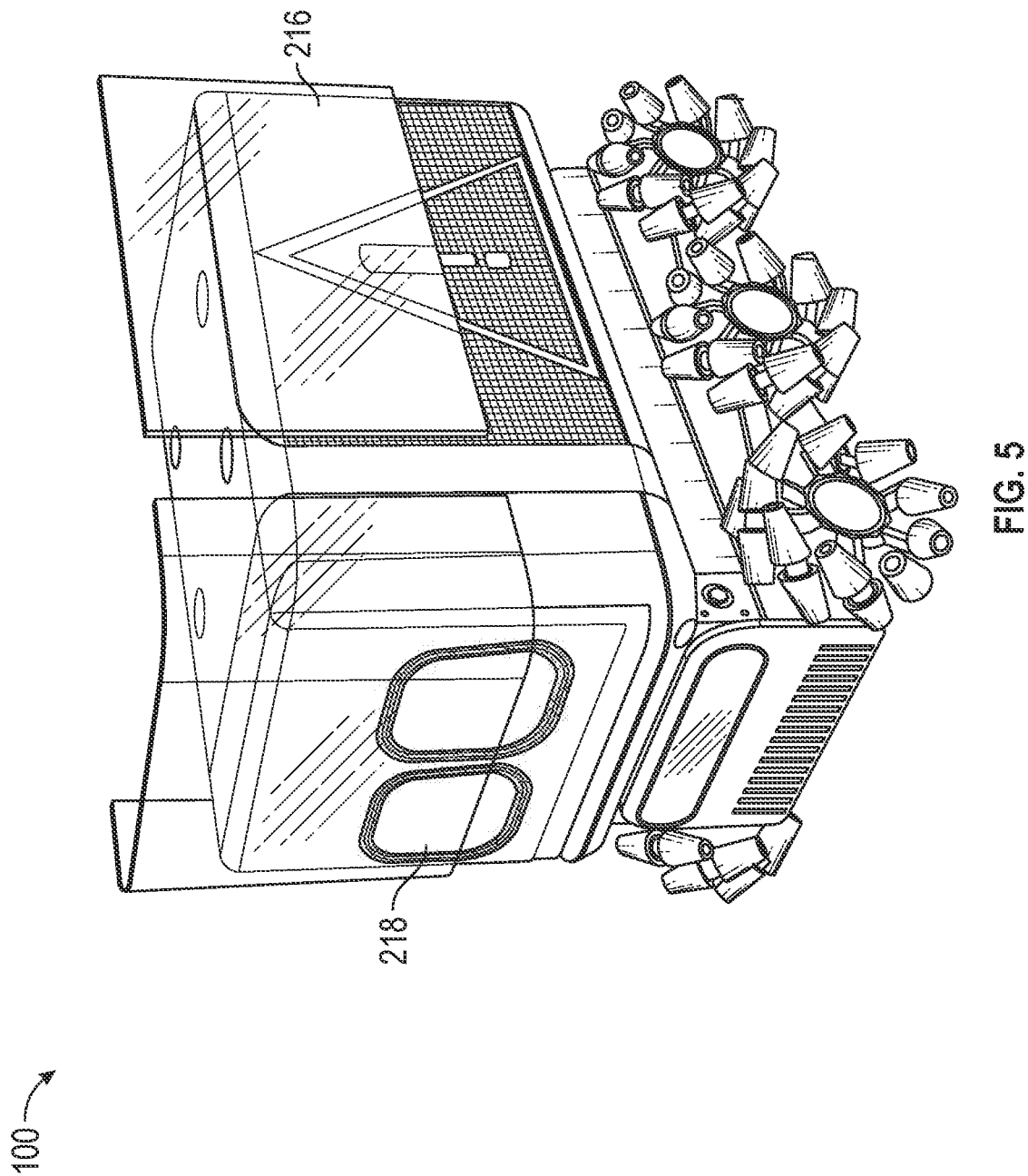
FIG. 5 illustrates the screens of the interlocking reconfigurable modular robot in accordance with the principles of the present disclosure.

Referring now to FIG. 5, display screens 216 and 218 are described. As shown in FIG. 5, screens 216 and 218 may be formed of a plurality of pixel LED lights, covered by a protection screen. Screen 216 and screen 218 may display information indicative of the status of modular robot 100 or delivery status. As shown in FIG. 5, screen 216 may display a warning sign, and screen 218 may express an "emotion" of modular robot 100. For example, when screen 216 displays the warning sign, screen 218 expresses an alerted expression, e.g., big eyes. When multiple modular containers are coupled together, their respective screens may be actuated to function together, thereby forming a single large screen for displaying information.

Figure 6A:
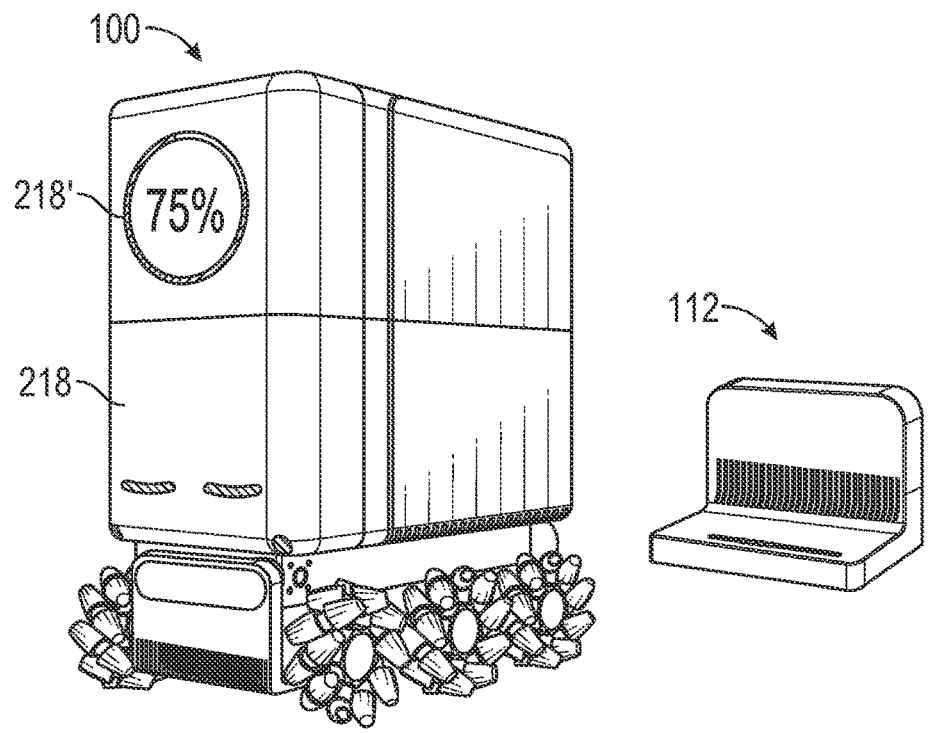
FIGS. 6A and 6B illustrate various informative displays of the interlocking reconfigurable modular robot in accordance with the principles of the present disclosure.

As shown in FIG. 6A, system 10 further may include external charger 112 for charging modular robot 100. Accordingly, charger 112 may have a geometry corresponding with the charge port of modular robot 100. As shown in FIG. 6A, screen 218 may express a "sleepy" expression, e.g., while modular robot 100 is charging, and screen 218' may display information indicative of the status of modular robot 100, e.g., battery/charge level.

Figure 6B:
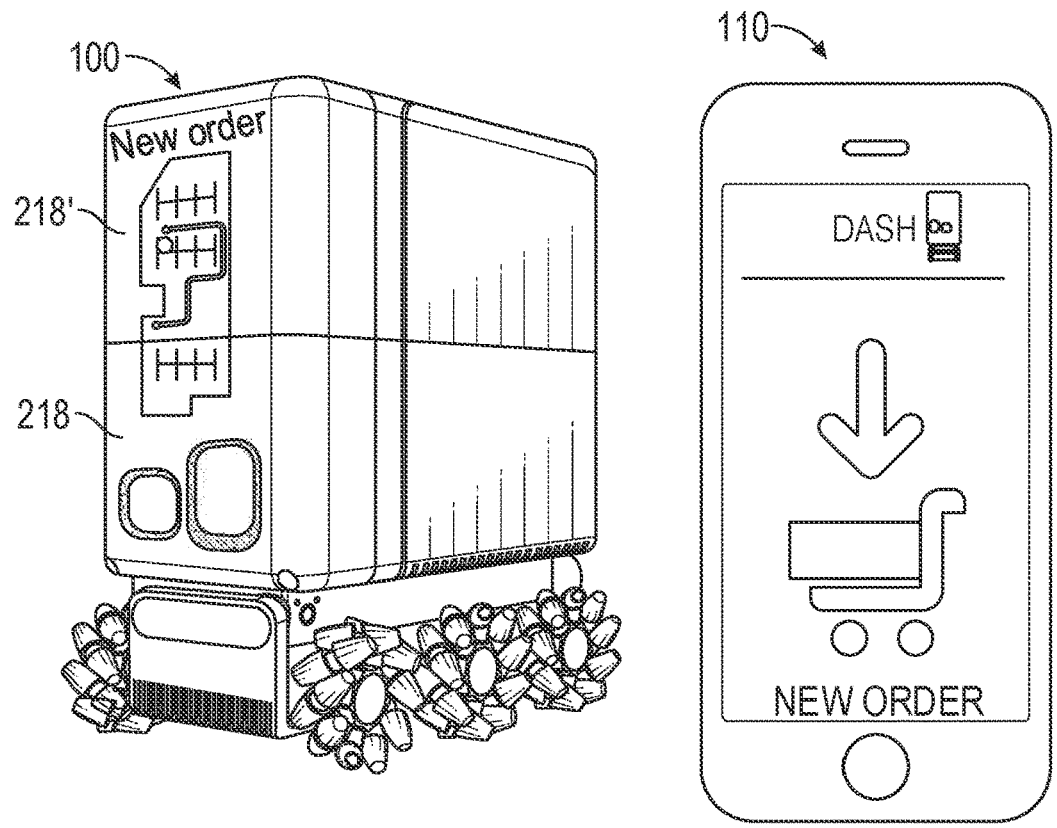

As shown in FIG. 6B, when a new order is initiated, e.g., when a package is ready to be picked up for delivery, mobile application 110 may display a notification that the new order is ready for pickup. Additionally, screen 218 may express an "awake" expression, and screens 218 and 218' together may display a map, e.g., of the warehouse whether the package is located as well as the location in the warehouse where the package is located and the path for modular robot 100 to get to the package. Additionally or alternatively, screens 216 and 216' also may display the map. After the package has been loaded into modular robot 100, the displays screen may display additional information such as estimated time of arrival of the delivery, etc.

Figure 7B:
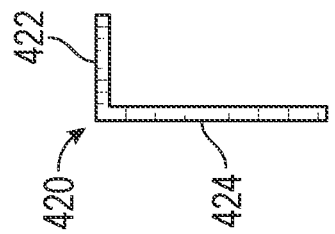
FIGS. 7A and 7B illustrates an exemplary lifting mechanism of the interlocking reconfigurable modular robot constructed in accordance with the principles of the present disclosure.
Figure 7A:
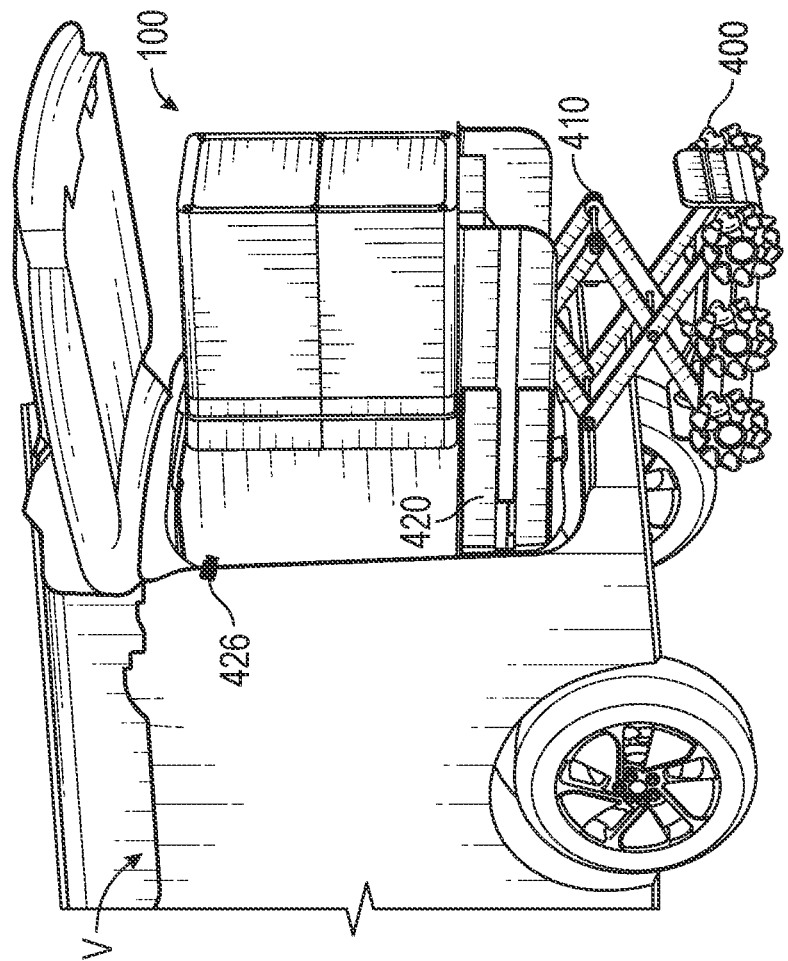

Referring now to FIGS. 7A and 7B, an exemplary lifting mechanism of modular robot 100 is described. As shown in FIG. 7A, base 400 of modular robot 100 may include lifting mechanism 410, e.g., a scissor lift, which may be actuated to vertically raise modular robot 100, and accordingly the one or more modular containers thereon, relative to the ground and wheels 408. Lifting mechanism 410 may lift modular robot 100 to a height such that modular robot 100 is aligned with vehicle V. Sensors onboard modular robot 100 may be used to facilitate alignment of modular robot 100 with vehicle V. Additionally or alternatively, one or more sensors 426 of vehicle V may be used to facilitate alignment of modular robot 100 with vehicle V. For example, sensors 426 may include fiducials. Although sensors 426 are shown in FIG. 7A as disposed at the rear of vehicle V, sensors 426 may be alternatively or additionally, disposed on loading arms 420, described in further detail below. Accordingly, lifting mechanism 410 may raise modular robot 100 until sensors 426 and/or the sensors onboard modular robot 100 indicate that modular robot 100 is aligned with vehicle 420. Moreover, lifting mechanism 410 may include a locking mechanism that may be actuated to lock lifting mechanism 410 in place when the desired height is reached.

In addition, vehicle V may include one or more loading arms 420, configured to extend and retract from vehicle V to engaged with modular robot 100, as shown in FIG. 7A. For example, loading arms 420 may be configured to extend and retract via telescoping. At full extension, loading arms 420 may extending across the entire length of modular robot 100. As shown in FIG. 7B, loading arm 420 may have an "L-shape," e.g., an upside-down "L-shape." Short portion 422 of loading arm 420 may be sized and shaped to support the underside of modular robot 100 when loading arm 420 is extended beneath modular robot 100, as shown in FIG. 7A. Moreover short portion 422 may have a length such that short portion 422 extends from long portion 424 to lifting mechanism 410. Accordingly, as shown in FIG. 7A, when both loading arms 410 are extended and engaged with modular robot 100, their respective short portions will be positioned beneath modular robot 100 and extend from their respective long portions toward lifting mechanism 410.

In some embodiments, base 400 may include a platform, which is the component of base 400 that is releasably coupled to the one or more modular containers as described above, such that lifting mechanism 410 is coupled to the underside of the platform to vertically raise the platform, and accordingly the one or more modular containers, relative to the ground. Thus, short portion 422 of loading arms 420 may rest underneath the platform when loading arms 420 are extended beneath modular robot 100. Accordingly, modular robot 100 may be aligned with vehicle V when modular robot 100 is vertically raised to a height such that loading arms 420 may extend and be positioned underneath modular robot 100.

Figure 8:
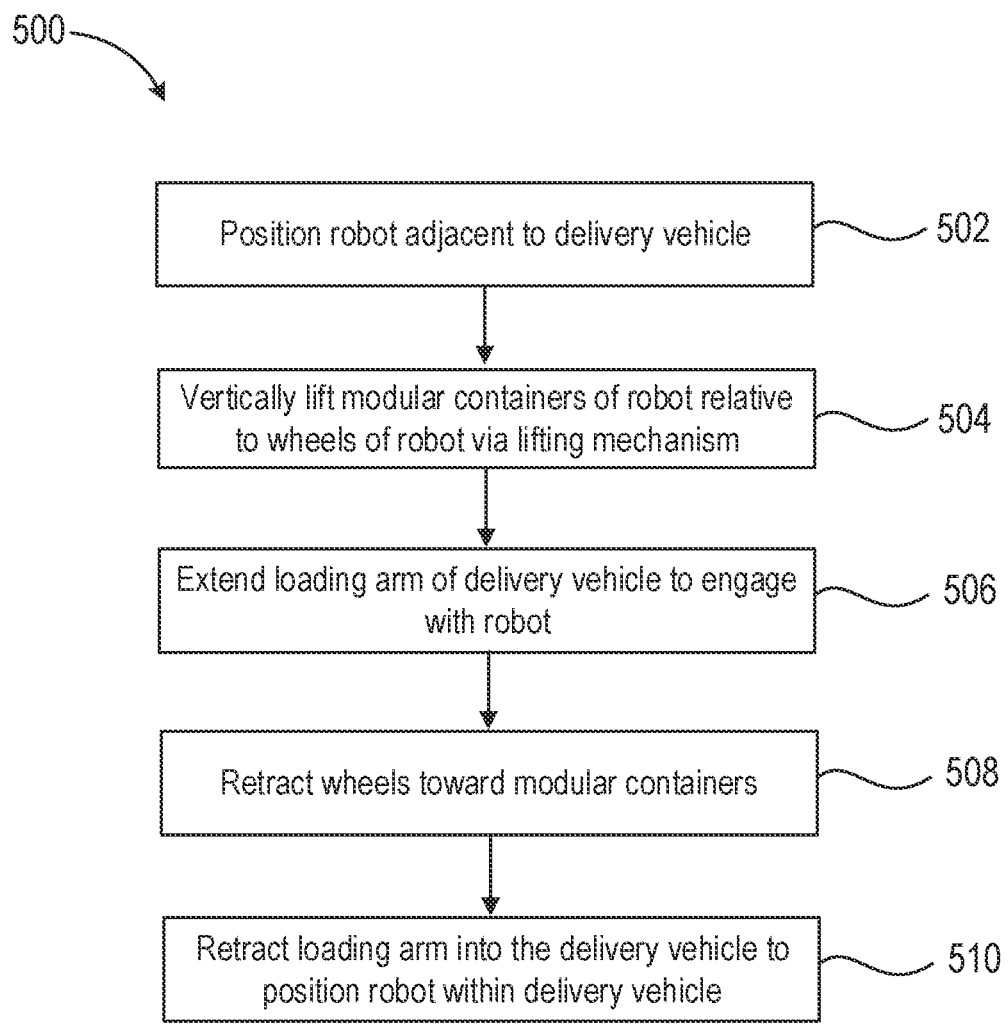
FIG. 8 is a flow chart illustrating exemplary steps for self-loading the interlocking reconfigurable modular robot into a delivery vehicle in accordance with the principles of the present disclosure.
Figure 9A:
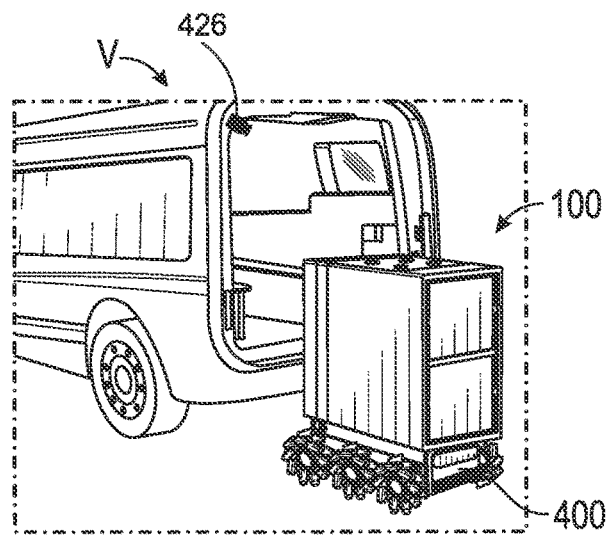
FIGS. 9A to 9E illustrate self-loading of the interlocking reconfigurable modular robot into a delivery vehicle in accordance with the principles of the present disclosure.
Figure 9B:
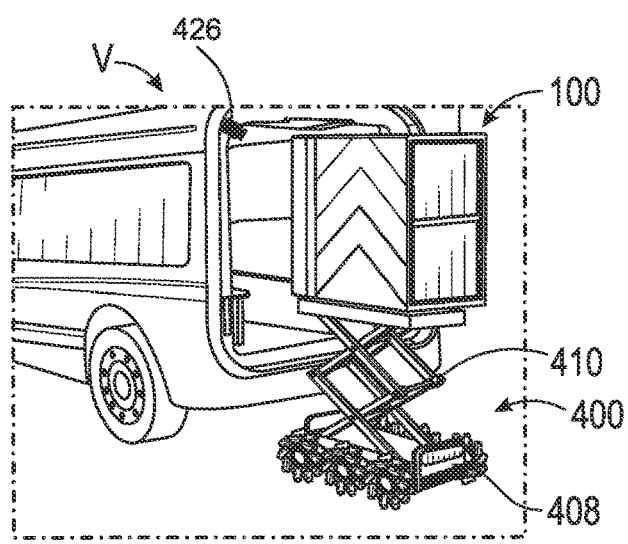

Referring now to FIG. 8, exemplary method 500 for self-loading modular robot 100 into delivery vehicle V is provided. Some of the steps of method 500 may be further elaborated by referring to FIGS. 9A to 9E. At step 502, modular robot 100 may approach vehicle V, e.g., at the rear of vehicle V, as shown in FIG. 9A, to thereby position modular robot 100 in a target position adjacent to vehicle V. At step 504, lifting mechanism 410 of base 400 may be extended to vertically lift the one or more modular containers of modular robot 100 to a height in alignment with vehicle V, e.g., using one or more sensors onboard vehicle V or modular robot 100, as shown in FIG. 9B. As shown in FIG. 9B, as lifting mechanism 410 is actuated to raise modular robot 100, the display screens of modular robot 100 may display upward facing arrows indicating that that modular robot 100 is being raised. When modular robot 100 is raised to the desired height in alignment with vehicle V, the locking mechanism of lifting mechanism 410 may be locked to lock lifting mechanism 410, and accordingly the one or more modular containers, in place relative to the ground and wheels 408.

Figure 9C:
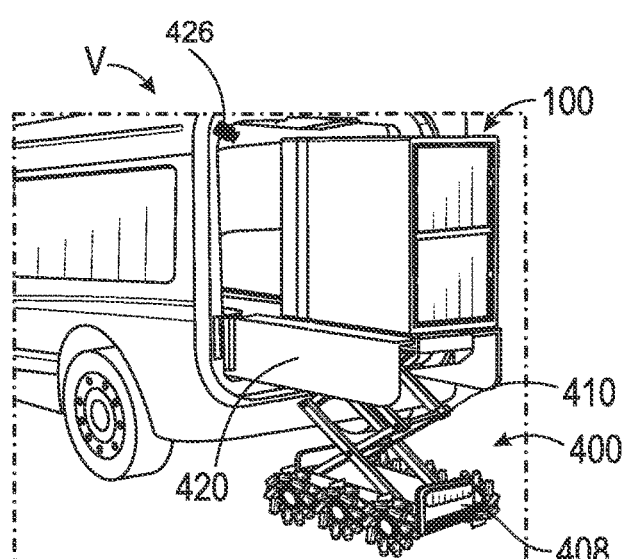
Figure 9D:
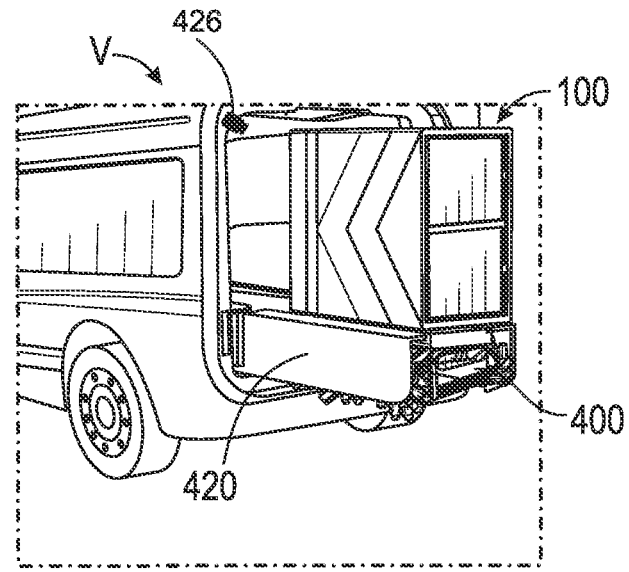
Figure 9E:
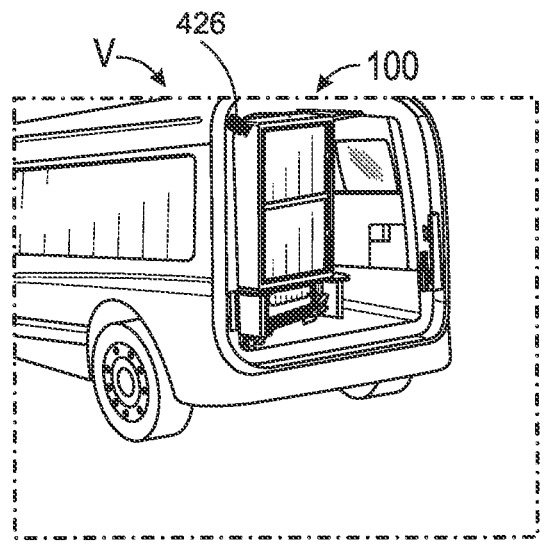

At step 506, loading arms 422 may be extended from vehicle V, e.g., along guide rails within vehicle V and/or telescoping, to engage with modular robot 100 to facilitate loading of modular robot 100 onto the delivery vehicle, as shown in FIG. 9C. For example, loading arms 420 may extend along the entire length of modular robot 100 such that short portion 422 of loading arms 420 rest underneath modular robot 100. At step 508, lifting mechanism 410 may be retracted to thereby retract wheels 408 toward the one or more modular containers, as shown in FIG. 9D. As the underside of modular robot 100 is rested on top of the top side of short portion 422 of loading arms 420, loading arms 420 will maintain modular robot at the aligned height as wheels 408 are retracted toward the one or more modular containers via lifting mechanism 410. Lifting mechanism 410 may retract wheels 408 until base 400 is sufficiently spaced relative to the one or more modular containers such that modular robot 100 may be retracted into vehicle V via loading arms 420, e.g., without colliding with the back/bumper of vehicle V. Accordingly, at step 510, loading arms 420 may be retracted into vehicle V to thereby position modular robot 100 within vehicle 100, as shown in FIG. 9E. As modular robot 100 is loaded into the delivery vehicle, the display screen may display arrows in the direction of movement of modular robot 100. If one or more additional modular robot needs to be self-loaded into vehicle 100, modular robot 100 may self-drive forward within vehicle 100 to provide space for the additional modular robot(s). As will be understood by a person ordinarily skilled in the art, multiple modular robots may be self-loaded into vehicle V.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for self-loading items into a delivery vehicle, the system comprising:
    two or more robots configured to be releasably coupled to one another, each of the two or more robots comprising one or more modular containers and a base configured to be releasably coupled to the one or more modular containers; and
    a plurality of sensors, comprising one or more cameras and one or more fiducials, the plurality of sensors configured to generate data to facilitate alignment of the two or more robots with the delivery vehicle,
    wherein at least one of the one or more cameras is coupled to each of the two or more robots and at least one of the one or more fiducials is coupled to the delivery vehicle,
    wherein the base comprises a plurality of wheels and a lifting mechanism configured to vertically lift the one or more modular containers to a height relative to the plurality of wheels at a substantially constant angle relative to a ground surface with which the plurality of wheels are in contact,
    wherein the height is selected to align the two or more robots with the delivery vehicle to facilitate self-loading of the two or more robots into the delivery vehicle, and
    wherein the lifting mechanism comprises a locking mechanism configured to lock, responsive to the data generated by the plurality of sensors, when the one or more modular containers are at the height.

2. The system of claim 1, further comprising a loading arm configured to retractably extend from the delivery vehicle to engage with the two or more robots when the one or more modular containers are at the height to facilitate the self-loading of the two or more robots into the delivery vehicle.

3. The system of claim 2, wherein the loading arm comprises an L-shaped loading arm.

4. The system of claim 3, wherein a short portion of the L-shaped loading arm is configured to support a bottom surface of the two or more robots when the one or more modular containers are at the height.

5. The system of claim 2, wherein the base comprises a platform configured to be releasably coupled to the one or more modular containers, such that the lifting mechanism is configured to vertically lift the platform relative to the plurality of wheels.

6. The system of claim 5, wherein the loading arm is configured to engage with the two or more robots via the platform of the base.

7. The system of claim 2, wherein the lifting mechanism is configured to retract the plurality of wheels toward the one or more modular containers when the two or more robots are engaged with the loading arm.

8. The system of claim 7, wherein the loading arm is configured to retract into the delivery vehicle when the plurality of wheels are fully retracted toward the one or more modular containers to thereby position the two or more robots within the delivery vehicle.

9. The system of claim 2, further comprising an additional loading arm configured to engage with the two or more robots on an opposite side of the lifting mechanism from the loading arm.

10. The system of claim 1, wherein the plurality of wheels are configured to position the two or more robots adjacent to the delivery vehicle to facilitate alignment of the two or more robots with the delivery vehicle.

11. The system of claim 1, wherein the lifting mechanism comprises a scissor lift.

12. A method for self-loading items into a delivery vehicle, the method comprising:
    positioning two or more robots, configured to be releasably coupled to one another and each comprising a base releasably coupled to one or more modular containers, adjacent to the delivery vehicle via a plurality of wheels of the base;
    generating, by a plurality of sensors comprising one or more cameras and one or more fiducials, data to facilitate alignment of the two or more robots with the delivery vehicle, the plurality of sensors comprising one or more cameras and one or more fiducials, at least one of the cameras coupled to each of the two or more robots and at least one of the fiducials coupled to the delivery vehicle;
    sensing, responsive to the data, a position of the two or more robots relative to the delivery vehicle;
    vertically lifting the one or more modular containers to a height relative to the plurality of wheels at a substantially constant angle relative to a ground surface with which the plurality of wheels are in contact via a lifting mechanism of the base, the height selected to align the two or more robots with the delivery vehicle, the lifting mechanism comprising a locking mechanism configured to lock, responsive to the data, when the one or more modular containers are at the height;

extending a loading arm from the delivery vehicle to engage with the base of at least one of the two or more robots;

retracting the plurality of wheels toward the one or more modular containers while the loading arm is engaged with the base; and retracting the loading arm into the delivery vehicle to thereby position the two or more robots within the delivery vehicle.

13. The method of claim 12, wherein the loading arm comprises an L-shape.

14. The method of claim 12, wherein the lifting mechanism comprises a scissor lift.

15. The method of claim 12, further comprising extending an additional loading arm from the delivery vehicle to engage with the base of at least one of the two or more robots, the additional loading arm configured to engage with the at least one of the two or more robots on an opposite side of the lifting mechanism from the loading arm.

* * * * *